United States Patent [19]

Moosbrucker et al.

[11] Patent Number: 4,514,969
[45] Date of Patent: May 7, 1985

[54] APPARATUS FOR PRODUCING A WRAPPED CYLINDRICAL BALE OF HARVESTED AGRICULTURAL MATERIAL

[76] Inventors: Karl Moosbrucker, Sonnenhalde 21, D-7968 Saulgau; Bernd Hollmann, Karl-Peters-Str. 17, D-4800 Bielefeld 1; Theodor Freye, Am Rowekamp 11, D-4834 Harsewinkel, all of Fed. Rep. of Germany

[21] Appl. No.: 592,648

[22] Filed: Mar. 23, 1984

[30] Foreign Application Priority Data

Mar. 26, 1983 [DE] Fed. Rep. of Germany ....... 3311132

[51] Int. Cl.³ .......................................... A01D 39/00
[52] U.S. Cl. ....................................... 56/341; 56/343; 100/88
[58] Field of Search .......................... 56/341, 343, 344; 100/88, 89, 5, 76

[56] References Cited

U.S. PATENT DOCUMENTS 4,057,954  11/1977  Mast ..................................... 56/341

FOREIGN PATENT DOCUMENTS 2634638  2/1978  Fed. Rep. of Germany ........ 56/341
2740299  3/1979  Fed. Rep. of Germany ........ 56/341

Primary Examiner—Jay N. Eskovitz
Attorney, Agent, or Firm—Pollock, Vande Sande and Priddy

[57] ABSTRACT

A roll bale press apparatus for rolling and wrapping harvested agricultural material comprises a prechamber that is disposed forward of a press region. A variable position pickup device is operative in a first position thereof to direct harvested agricultural material through a first inlet orifice into the press region, and is operative in a second position thereof to direct harvested agricultural material into the prechamber. The apparatus includes a second inlet orifice above the first inlet orifice, between the prechamber and press region, through which harvested agricultural material may pass from the prechamber into the press region, and the prechamber includes a transport mechanism for conveying material in the prechamber upwardly to the second inlet orifice.

9 Claims, 5 Drawing Figures

APPARATUS FOR PRODUCING A WRAPPED CYLINDRICAL BALE OF HARVESTED AGRICULTURAL MATERIAL

BACKGROUND OF THE INVENTION

The present invention relates to an apparatus for rolling and wrapping harvested agricultural material into a cylindrical bale of roll configuration, the apparatus preferably comprising a mechanism that is adapted to be towed through a field and which defines a prechamber located adjacent the front of the apparatus for receiving harvested material that is picked up from the field, and a press region rearward of the prechamber, the periphery of the press region being defined by conveyor elements such as rotating rollers.

An apparatus of this general type has been described heretofore in German Offenlegungsschrift No. 2 740 299. The prechamber in this prior apparatus is defined by a front fixed wall and a rear pivotable wall. During normal operation, harvested material that is picked up is conveyed by a horizontal conveyor belt through an inlet orifice into the press region. At the same time, the rear pivotable wall of the prechamber is swung downward so as to form the upper boundary of the feed channel. The prechamber is intended to maintain an even flow of material during a wrapping operation and during ejection of the finished bale from the press region; and during the wrapping operation, the aforementioned rear pivotable wall of the prechamber is swung upwardly so that the incoming harvested material is no longer conveyed through the inlet orifice into the press region but, instead, is conveyed into the prechamber.

After the wrapping operation has been completed, the material located in the prechamber is intended to be delivered into the press region through the aforementioned inlet orifice. To accomplish this, the pivotable rear wall of the prechamber is swung downwardly. In practice, however, due to the particular construction which is employed in this prior apparatus, the harvested material tends to pile up in the region of the inlet orifice, i.e., the harvested material which has been collected in the prechamber does not discharge properly into the press chamber.

The object of the present invention is to provide an apparatus of the general type described above wherein, however, the apparatus is so arranged and constructed that material collected in the prechamber can be conveyed into the press region quickly and reliably, without pile-ups occurring during the feeding of the harvested agricultural material from the prechamber into the press region.

SUMMARY OF THE INVENTION

The aforementioned object of the present invention is accomplished by providing the apparatus with a second inlet orifice that is disposed between the prechamber and press region at a location above the first inlet orifice described previously, and by providing the prechamber with transport means which function to convey harvested material within the prechamber upwardly to the said second inlet orifice. By this arrangement, therefore, during the emptying of the prechamber harvested agricultural material can be fed to the press space via both inlet orifices. This arrangement assures not only that the harvested material will be properly conveyed into the prechamber, but also insures that, after a wrapping operation has been completed, the quantity of harvested material that has been accumulated in the prechamber can be conveyed into the press region quickly and without any pile-up.

The transport means used in the prechamber can take a variety of forms, i.e., rotating rollers, reciprocating rakes, movable conveyor belts, etc. In addition, the arrangements employed can include means for selectively opening or closing the second inlet orifice, and can indeed use a portion of the transport mechanism in the prechamber for this purpose.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
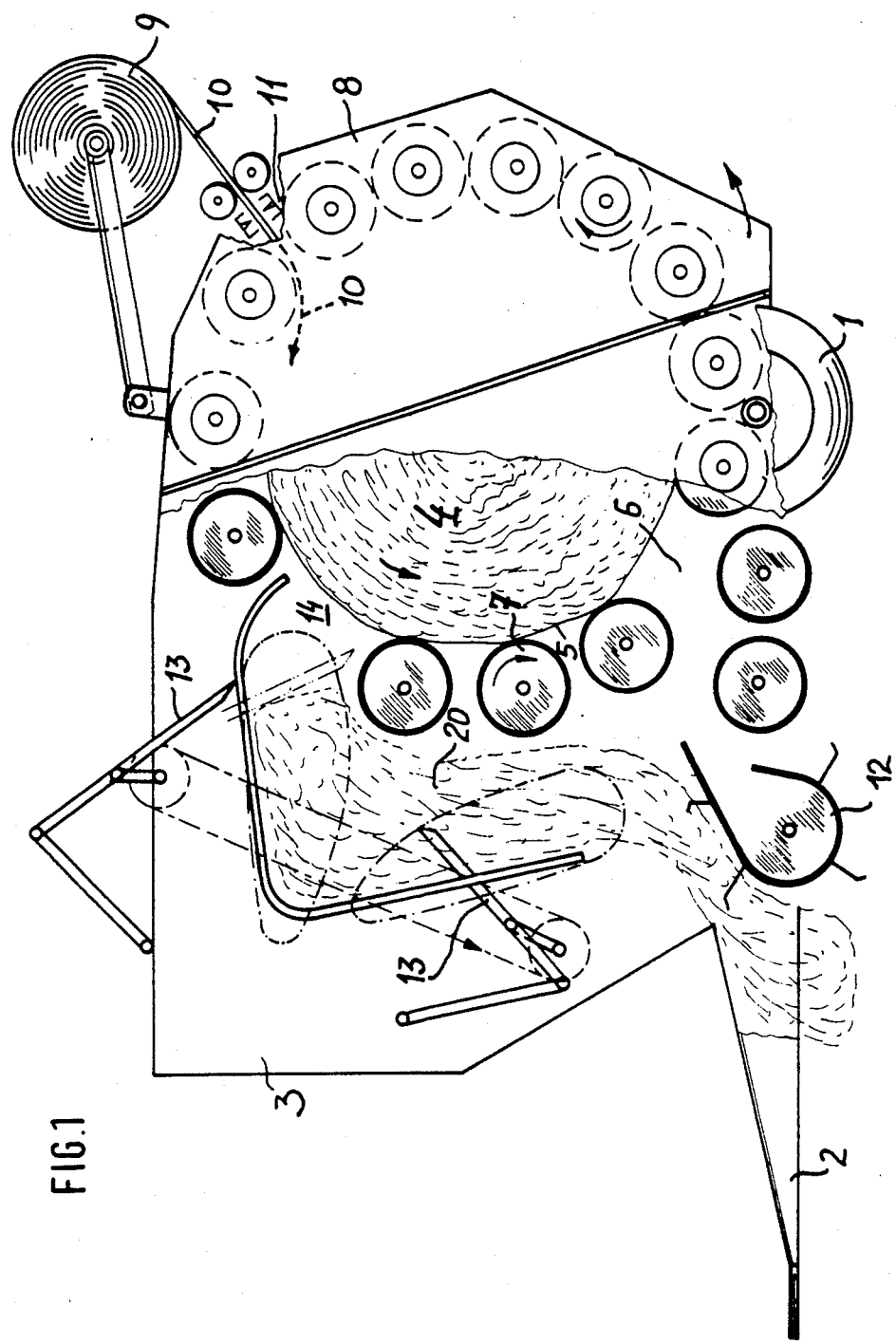
FIG. 1 is a diagrammatic, partially cross-sectional side view of a first embodiment of the present invention.

In each of the embodiments of the present invention, the roll-bale press apparatus comprises a mechanism which is supported on ground-engaging wheels 1, mounted for rotation about a single axle, and having a drawbar 2 adjacent the forward end of the apparatus to permit the apparatus to be towed through a field of harvested agricultural material. In each embodiment, moreover, a prechamber 3 is located above the drawbar 2 adjacent the forward end of the apparatus, and a press region 4 is located rearward of the prechamber 3, the roll bale 5 being formed in said press region. During normal feed operation, harvested material flows through a first inlet orifice 6 into the press region 4 where it is formed into a cylindrical bale and wrapped. The periphery of the press region is defined by a plurality of rollers 7 which are mounted for rotation on spaced horizontal axes, the axes of said rollers being disposed in intersecting relation to a closed circle which surrounds the press region 4. In all embodiments, moreover, the rear rollers 7 are mounted on a pivotal flap 8 which can be swung upwardly about a pivot point disposed adjacent the top of the apparatus to permit a roll bale 5 that has been formed in the press region to be ejected to the rear of the apparatus. A supply roll 9 of wrapping material 10, and an associated cutting device 11 for the wrapping material 10, are mounted on the flap 8 adjacent the upper rear end of the apparatus.

Each embodiment further includes a pick-up device 12 which is located adjacent the forward lower surface of the apparatus, and which operates to gather harvested agricultural material and to direct the same to the interior of the apparatus. The pick-up device 12 is mounted for pivotal movement so that in one position thereof (as best shown in FIGS. 3 and 5) the harvested agricultural material is directed through inlet orifice 6 into the press region 4. In a second possible position of the pivotal pick-up device 12 (best shown in FIGS. 1, 2 and 4) the pick-up device 12 functions to direct the gathered material into the prechamber 3, rather than through orifice 6. The device 12 is pivoted into its said first position, to pass harvested agricultural material through inlet orifice 6 into the press region 4, when the press region 4 is being supplied with material that is to be rolled and wrapped into a bale. The device 12 is thereafter pivoted into its second position so that additional material which is being gathered as the apparatus is towed through the fields can be directed into the prechamber 3 while the material previously introduced into press chamber 4 is being rolled and wrapped. The alterations in position of device 12, the pivotal motion of flap 8, the rotation of the various rollers in the apparatus, the movement of the various conveyors and transport means to be described, etc., can be effected by any of a variety of manually operable control means and/or power means which are driven by rotation of wheels 1 and/or by their own power sources. These mechanisms have not been illustrated in the drawings inasmuch as they do not per se form a portion of the present invention and can be implemented in a variety of ways that will be readily apparent to persons skilled in the art.

Each embodiment of the invention includes a second inlet orifice 14 that is located between the prechamber 3 and press region 4 at a position above the first inlet orifice 6. In addition, each embodiment includes transport means within the prechamber 3 for conveying harvested agricultural material that has been placed in the prechamber 3 upwardly from the bottom of said chamber to the second inlet orifice 14. The provision of this second inlet orifice and the associated transport means in the prechamber 3 can be effected in various different ways which will now be described.

In the embodiment of FIG. 1, the rollers 7 at the forward end of the press region 4, which define the forward periphery of said press region, are spaced somewhat from the rollers at the bottom of the press region to define the first inlet orifice 6, and are spaced somewhat from the rollers at the top of the press region to define the second inlet orifice 14. The transport means in the prechamber 3 comprise a plurality of rakes 13 which are mounted on articulated joints adjacent the lower and upper portions of said prechamber 3, and which are driven by rotation of pulleys that are interconnected to one another by a chain. When so driven, the free edges of the rakes 13 describe paths of motion which are illustrated in broken line in FIG. 1. These paths of motion are such that the lower rakes 13 carry harvested agricultural material from a region immediately above pick-up device 12 upwardly past the aforementioned forward rollers 7, as shown by numeral 20, to a location adjacent but forward of orifice 14; and the motion described by the free end of the upper rakes 13 then transports the flowing material 20 toward and through the orifice 14 into the press region 4. This flow of material within the prechamber 3 is assisted by an inverted L-shaped guide which has a plurality of elongated slots through which the rakes 13 can pass as they move to transport material upwardly in prechamber 3 to and through orifice 14.

In normal operation, when it is desired to form a wrapped bale, pick-up device 12 is pivoted so as to direct incoming material through inlet orifice 6 into region 4, and rakes 13 are operated to transport any material in prechamber 3 upwardly and thence through the second inlet orifice 14 into the press region. When the material so placed in press region 4 is being formed into a wrapped bale, the pick-up device 12 is pivoted to the position shown in FIG. 1 so that further harvested material is directed into the prechamber 3 rather than into the press region 4. In this latter phase of operation the rakes 13 are not operated. After the roll bale has been completed and ejected by the pivoting of flap 8 as described previously, pick-up device 12 is repositioned so as to direct incoming material through inlet orifice 6, and rakes 13 are operated to transport material within the prechamber 3 through orifice 14.

Figure 2:
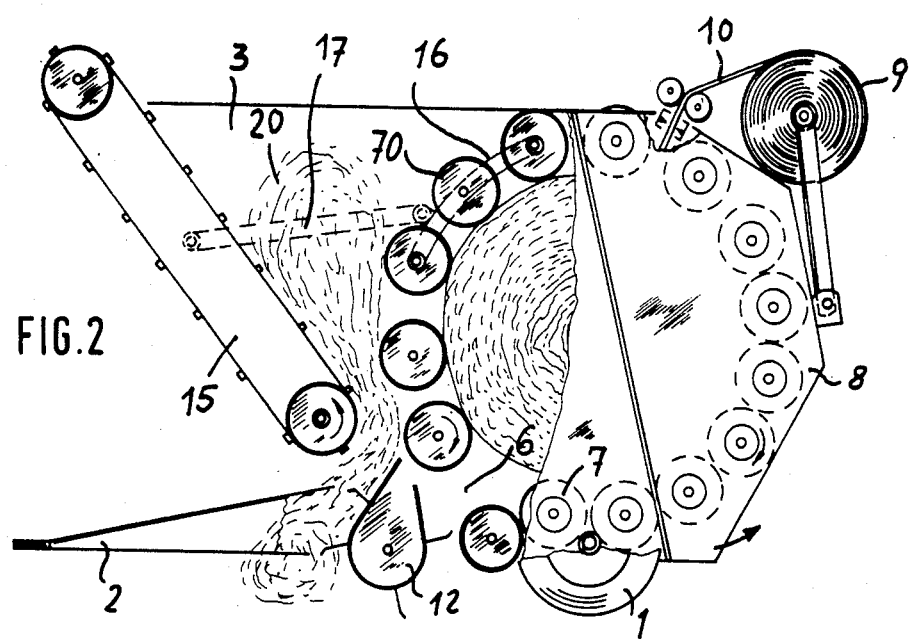
FIG. 2 is a diagrammatic partially cross-sectional side view of a second embodiment of the invention showing the relative disposition of parts in a first working phase.
Figure 3:
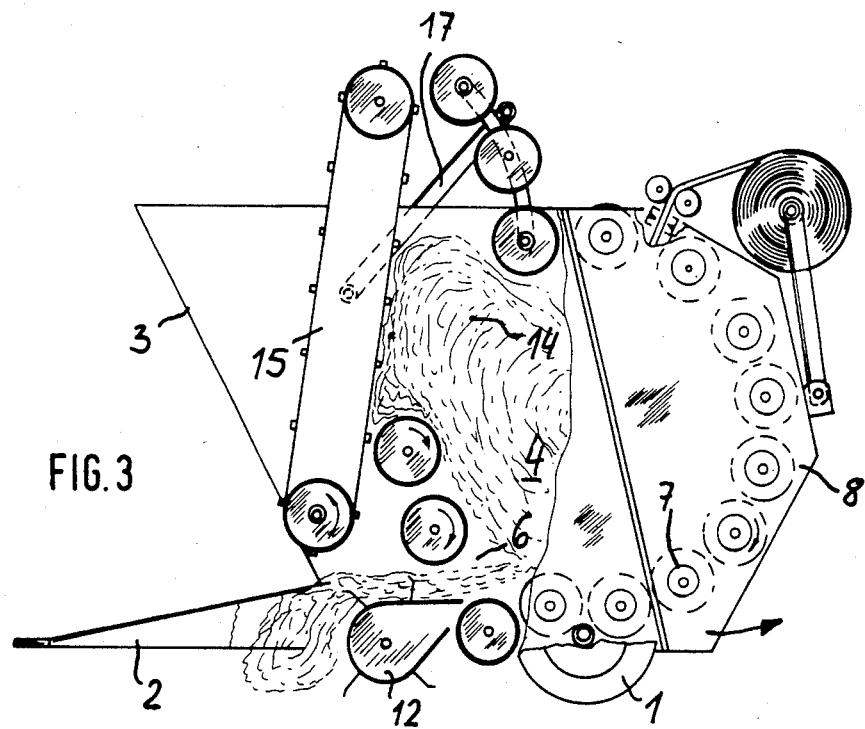
FIG. 3 depicts the embodiment of FIG. 2 in a second working phase, i.e., when the harvested material is being transferred from the prechamber into the press region.
Figure 4:
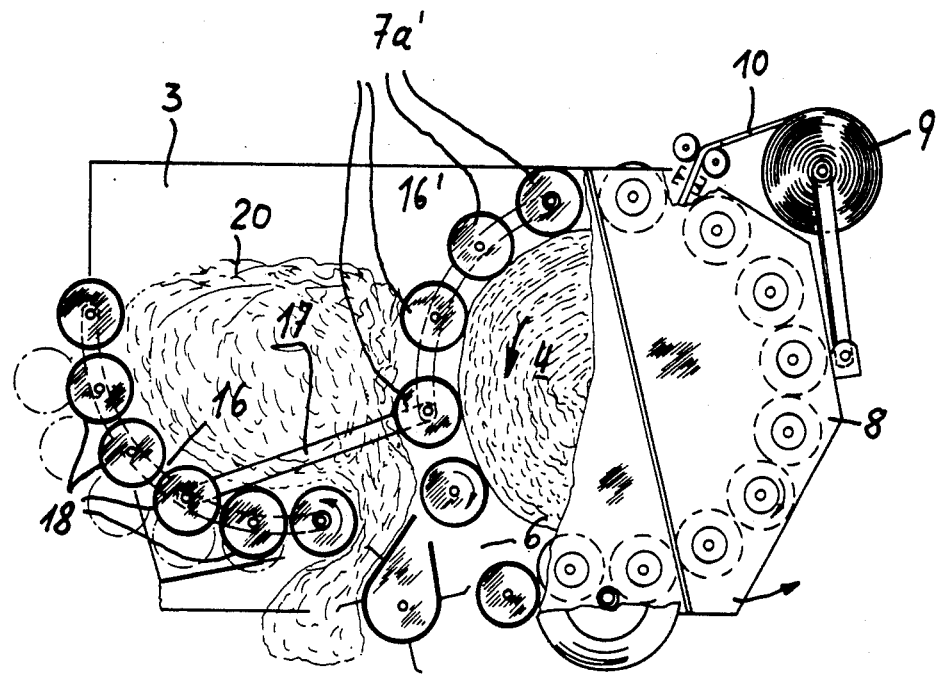
FIG. 4 is a diagrammatic partially cross-sectional side view of a third embodiment of the invention showing the operation of the device when harvested material is being conveyed into the prechamber.
Figure 5:
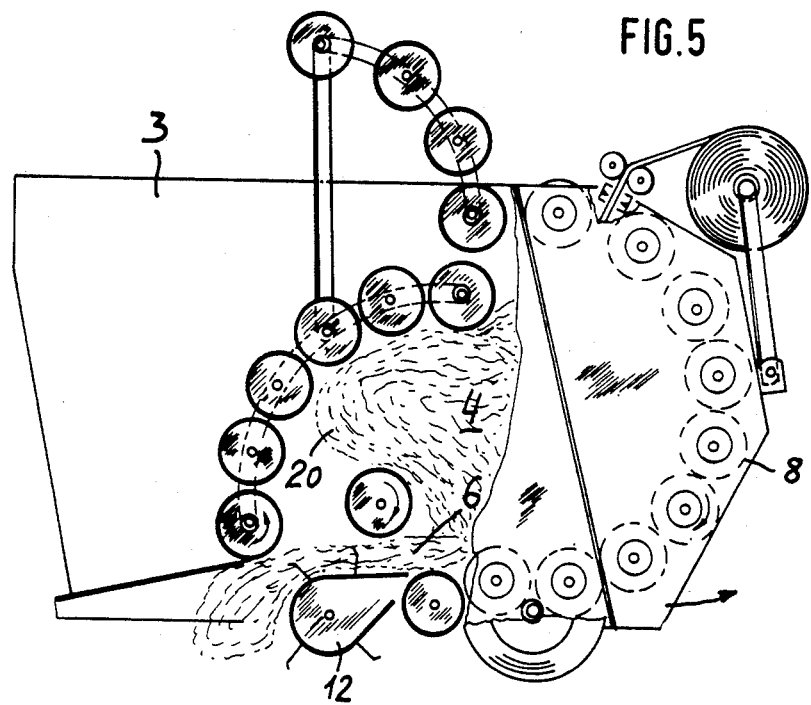
FIG. 5 illustrates the embodiment of FIG. 4 during the transfer of material from the prechamber into the press region.

In the embodiment of FIGS. 2 and 3, as well as in the embodiment of FIGS. 4 and 5, the same general operation occurs. However these latter embodiments employ mechanisms which are physically different from those employed in the embodiment of FIG. 1.

In the embodiment of FIGS. 2 and 3, the prechamber transport mechanism comprises an inclined conveyor belt 15 which is pivotable about its lower axis, and which is located adjacent the front end of the prechamber 3. Moreover in this embodiment three of the aforementioned rollers, i.e., rollers 7a, are mounted on a common arcuate support 16 which is connected to the inclined conveyor belt 15 by means of a lever 17. In the position shown in FIG. 2 of these elements, and of the associated elements previously described by reference to FIG. 1, the rollers 7a effectively close the upper or second inlet orifice 14 so that material which is being directed at this time into the prechamber 3 by pick-up device 12 is prevented from passing into the press region 4. When conveyor belt 15 is pivoted into the position shown in FIG. 3, however, the lever 17 which interconnects the pivotal conveyor belt with roller support 16 causes the rollers 7a to be lifted upwardly as shown in FIG. 3, thereby opening the upper inlet orifice 14. At the same time the pick-up device 12 is (as shown in FIG. 3) pivoted to a position wherein incoming material is directed through the lower orifice 6. Material accordingly passes through both of the orifices 6 and 14 into press region 4.

The embodiment of FIGS. 4 and 5 is similar to the embodiment of FIGS. 2 and 3 except that, instead of using an inclined conveyor belt 15, this further embodiment uses a plurality of conveyor rollers 18 which are mounted on an arcuate roller frame 16". Roller frame 16" is connected via a lever 17' to a further roller frame 16' which supports rollers 7a'. When these various components are in the relative positions shown in FIG. 4, the pick-up device 12 directs harvested agricultural material into the prechamber 3 rather than toward lower inlet orifice 6, so that the material can accumulate in prechamber 3 while material previously placed in press chamber 4 is being formed into a roll bale. After the roll bale has been completed and ejected, the several elements are repositioned as shown in FIG. 5 to open each of orifices 6 and 14, so that material which is being gathered by pick-up device 12 is now directed through orifice 6 while material 20 previously placed in prechamber 3 is fed into the press region 4 via the upper inlet orifice.

Having thus described our invention, we claim:

1. A mechanism for rolling and wrapping harvested agricultural material to produce a roll bale of said agricultural material, comprising a roll bale press apparatus adapted to be moved through a field of harvested agricultural material, said apparatus having first means defining a prechamber that is disposed adjacent the forward portion of said apparatus relative to the direction of movement of said apparatus, second means defining a press region that is disposed rearwardly of said prechamber, and means for supplying wrapping material to said press region, means defining a first inlet orifice through which harvested agricultural material may pass from the exterior of said apparatus into said press region, means defining a second inlet orifice through which harvested agricultural material may pass from said prechamber into said press region, said second inlet orifice being located within said apparatus at a position above said first inlet orifice, said apparatus further including a variable position pick-up device operative in a first position thereof to direct harvested agricultural material through said first inlet orifice into said press region and operative in a second position thereof to direct harvested agricultural material into said prechamber, and transport means within said prechamber for conveying harvested agricultural material in said prechamber upwardly to said second inlet orifice.

2. The mechanism of claim 1 wherein said transport means includes means for selectively opening and closing said second inlet orifice.

3. The mechanism of claim 1 wherein said transport means comprises a plurality of rollers which are mounted for rotation respectively on spaced substantially parallel axes.

4. The mechanism of claim 3 wherein at least some of said rollers are located between said prechamber and said press region and are operative to define a portion of the periphery of said press region.

5. The mechanism of claim 1 wherein said transport means comprises an inclined conveyor belt.

6. The mechanism of claim 5 wherein said conveyor belt is mounted for pivotal movement toward and away from said press region about a pivot that is located adjacent one end of said belt.

7. The mechanism of claim 1 wherein said transport means comprises a plurality of movable rakes.

8. The mechanism of claim 1 wherein said prechamber includes conveyor elements mounted for movement toward and away from said second inlet orifice to selectively close and open said second inlet orifice.

9. The mechanism of claim 8 wherein said conveyor elements comprise rollers whose axes of rotation are disposed in parallel relation to one another and in intersecting relation to a circle which surrounds said press region when said rollers are positioned to close said second inlet orifice.

* * * * *